(12) United States Patent
Hiraga et al.

(10) Patent No.: US 12,546,602 B2
(45) Date of Patent: Feb. 10, 2026

(54) SENSOR AND ELECTRONIC DEVICE

(71) Applicant: KABUSHIKI KAISHA TOSHIBA, Tokyo (JP)

(72) Inventors: Hiroki Hiraga, Saitama Saitama (JP); Yasushi Tomizawa, Fuchu Toyko (JP); Kengo Uchida, Kawasaki Kanagawa (JP); Kei Masunishi, Kawasaki Kanagawa (JP); Fumito Miyazaki, Yokohama Kanagawa (JP); Ryunosuke Gando, Yokohama Kanagawa (JP); Shiori Kaji, Kawasaki Kanagawa (JP); Etsuji Ogawa, Kawasaki Kanagawa (JP); Daiki Ono, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 295 days.

(21) Appl. No.: 18/175,238

(22) Filed: Feb. 27, 2023

(65) Prior Publication Data

US 2024/0019248 A1  Jan. 18, 2024

(30) Foreign Application Priority Data

Jul. 14, 2022  (JP) .................................. 2022-113237

(51) Int. Cl.
*G01C 19/5769* (2012.01)
*G01C 19/5733* (2012.01)

(52) U.S. Cl.
CPC ..... *G01C 19/5769* (2013.01); *G01C 19/5733* (2013.01)

(58) Field of Classification Search
None
See application file for complete search history.

(56) References Cited

U.S. PATENT DOCUMENTS 10,767,992 B2  9/2020  Ikehashi
2007/0222011 A1*  9/2007  Robert ............... G01C 19/5769
257/415

(Continued)

FOREIGN PATENT DOCUMENTS

JP  2009-130328 A  6/2009
JP  2013-217844 A  10/2013

(Continued)

OTHER PUBLICATIONS

Japan Patent Office, Office Action in JP App. No. 2022-113237 (Jun. 13, 2025).

(Continued)

*Primary Examiner* — Mark A Shabman
(74) *Attorney, Agent, or Firm* — Finnegan, Henderson, Farabow, Garrett & Dunner, LLP

(57) ABSTRACT

According to one embodiment, a sensor includes a base body including a first face, a first support portion, a first movable portion, and a first insulating member. The first face includes a first base region, a second base region, and a third base region. The first support portion is fixed to the third base region. The first movable portion is supported by the first support portion. The first movable portion includes a first movable region and a second movable region. A first gap is provided between the first base region and the first movable region. The first insulating member is fixed to the second base region, and located between the second base region and the second movable region in a first direction from the third base region to the first support portion. A second gap is provided between the first insulating member and the second movable region.

18 Claims, 8 Drawing Sheets

(56) References Cited

U.S. PATENT DOCUMENTS

| | | | |
|---|---|---|---|
| 2012/0025333 A1* | 2/2012 | Yoshida | G01P 15/125 |
| | | | 257/415 |
| 2013/0049212 A1* | 2/2013 | Hata | G01C 19/5762 |
| | | | 257/773 |
| 2016/0097792 A1* | 4/2016 | Naumann | G01P 15/18 |
| | | | 73/504.02 |
| 2017/0138981 A1 | 5/2017 | Hayashi et al. | |
| 2018/0252744 A1 | 9/2018 | Kamada et al. | |
| 2019/0162750 A1* | 5/2019 | Tanaka | G01P 15/097 |
| 2020/0039814 A1* | 2/2020 | Tanaka | G01P 15/125 |
| 2020/0067479 A1* | 2/2020 | Ikehashi | H03H 9/2431 |
| 2020/0284582 A1 | 9/2020 | Kaji et al. | |
| 2020/0363205 A1 | 11/2020 | Gando et al. | |
| 2021/0381831 A1 | 12/2021 | Gando et al. | |
| 2021/0396780 A1 | 12/2021 | Masunishi et al. | |
| 2022/0137085 A1 | 5/2022 | Masunishi et al. | |
| 2022/0163558 A1 | 5/2022 | Nagata | |
| 2022/0259035 A1 | 8/2022 | Masunishi et al. | |
| 2022/0268583 A1 | 8/2022 | Gando et al. | |
| 2022/0276052 A1 | 9/2022 | Hiraga et al. | |

FOREIGN PATENT DOCUMENTS

| | | | |
|---|---|---|---|
| JP | 2017-146312 A | 8/2017 | |
| JP | 6691882 B2 | 5/2020 | |
| JP | 2021-16923 A | 2/2021 | |
| JP | 6939475 B2 | 9/2021 | |
| JP | 2021-192012 A | 12/2021 | |
| JP | 2022-1828 A | 1/2022 | |
| JP | 2022-52997 A | 4/2022 | |
| JP | 2022-74658 A | 5/2022 | |
| JP | 2022-081956 A | 6/2022 | |
| JP | 2022-125454 A | 8/2022 | |
| JP | 2022-129691 A | 9/2022 | |
| JP | 2022-131004 A | 9/2022 | |
| JP | 2022-162641 A | 10/2022 | |
| WO | WO 2015/151946 A1 | 10/2015 | |

OTHER PUBLICATIONS

Japan Patent Office, Office Action in JP App. No. 2022-113237 (Sep. 1, 2025).

* cited by examiner

SENSOR AND ELECTRONIC DEVICE

CROSS-REFERENCE TO RELATED APPLICATIONS

This application is based upon and claims the benefit of priority from Japanese Patent Application No. 2022-113237, filed on Jul. 14, 2022; the entire contents of which are incorporated herein by reference.

FIELD

Embodiments described herein relate generally to a sensor and an electronic device.

BACKGROUND

There is a sensor such as a gyro sensor or the like. Stable characteristics are desired in sensors and electronic devices.

DETAILED DESCRIPTION

Figure 1:
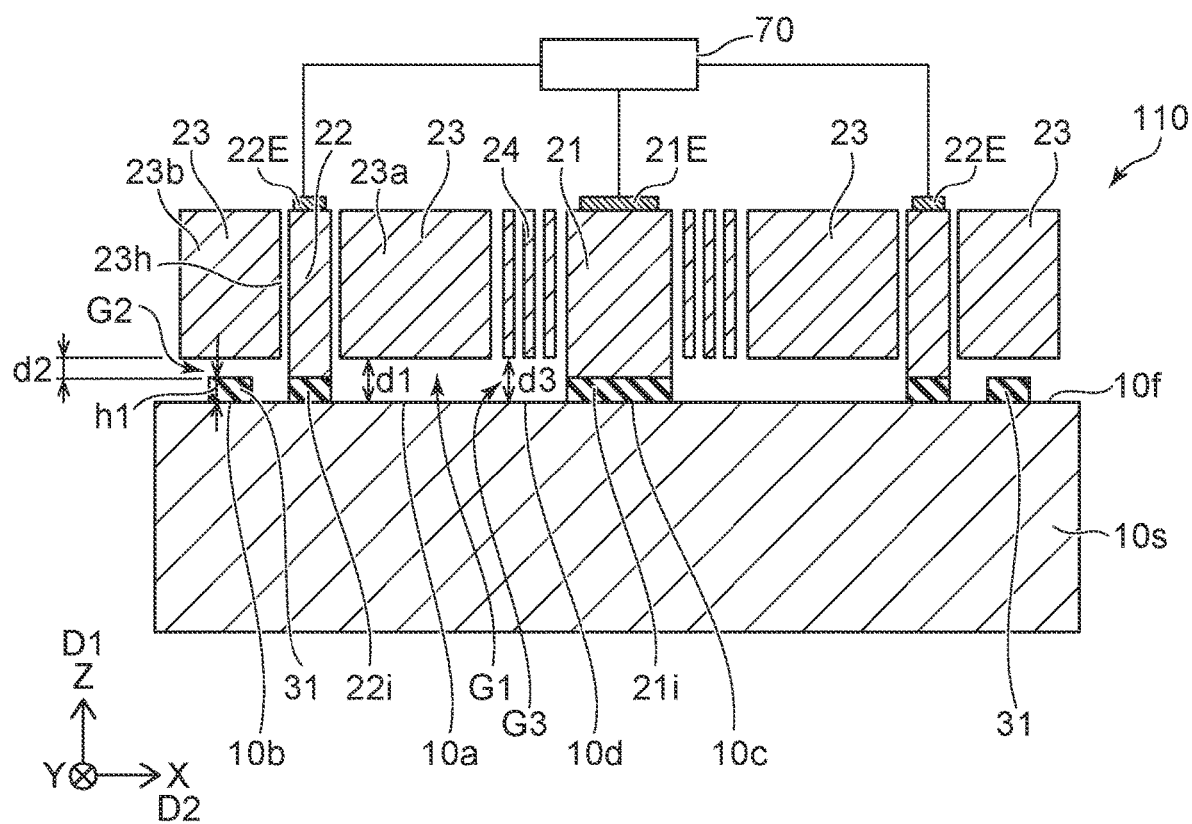
FIG. 1 is a schematic cross-sectional view illustrating a sensor according to a first embodiment.

According to one embodiment, a sensor includes a base body, a first support portion, a first movable portion, and a first insulating member. The base body includes a first face. The first face includes a first base region, a second base region, and a third base region. The first support portion is fixed to the third base region. The first movable portion is supported by the first support portion. The first movable portion includes a first movable region and a second movable region. A first gap is provided between the first base region and the first movable region. The first insulating member is fixed to the second base region. The first insulating member is located between the second base region and the second movable region in a first direction from the third base region to the first support portion. A second gap is provided between the first insulating member and the second movable region. A second distance between the first insulating member and the second movable region along the first direction is shorter than a first distance between the first base region and the first movable region along the first direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a sensor according to the first embodiment.

Figure 2:
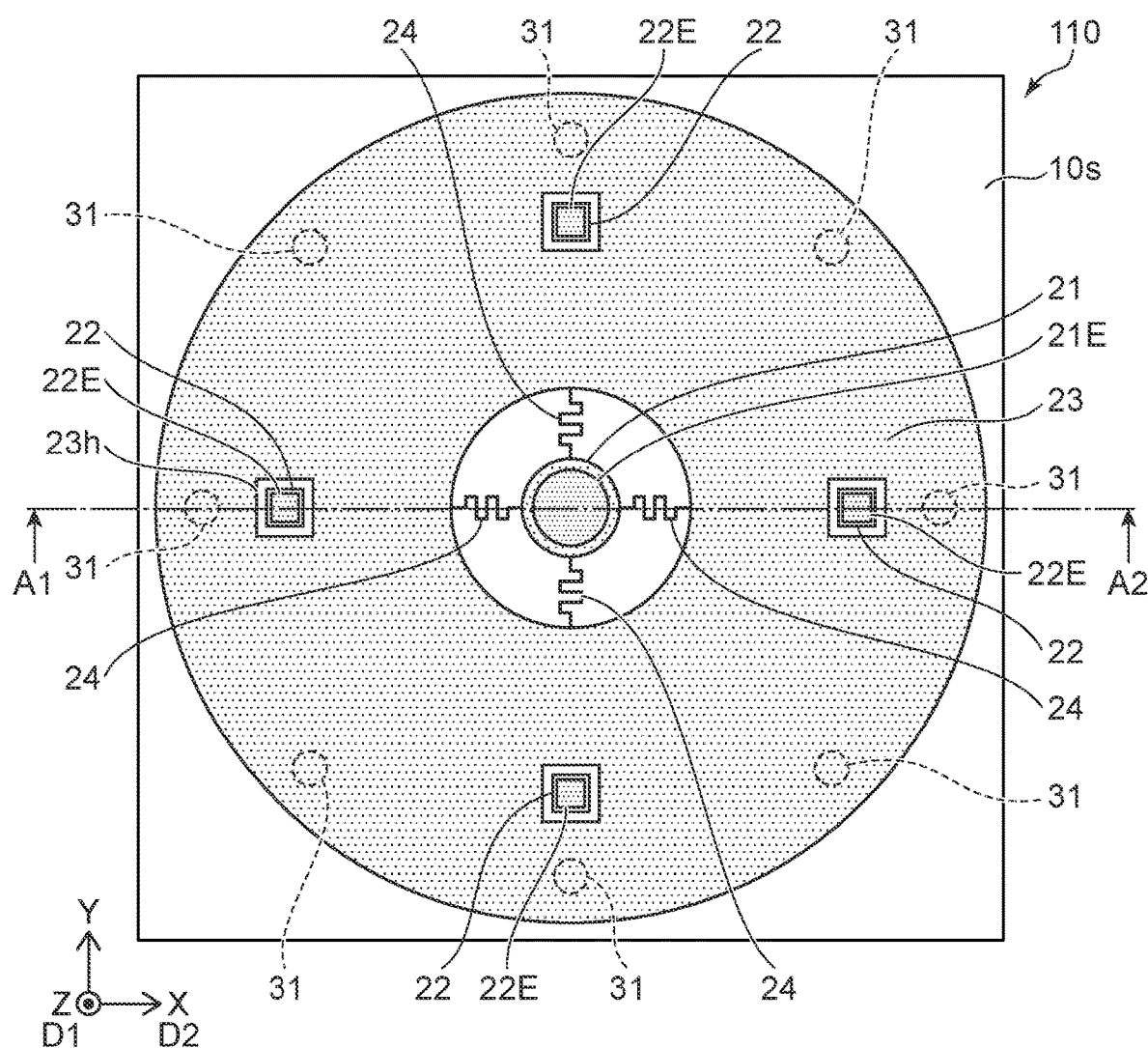
FIG. 2 is a schematic plan view illustrating the sensor according to the first embodiment.

FIG. 2 is a schematic plan view illustrating the sensor according to the first embodiment.

FIG. 1 is a cross-sectional view taken along the line A1-A2 in FIG. 2.

As shown in FIG. 1, a sensor 110 according to the embodiment includes a base body 10s, a first support portion 21, a first movable portion 23, and a first insulating member 31.

The base body 10s includes a first face 10f. The first face 10f includes a first base region 10a, a second base region 10b and a third base region 10c.

The first support portion 21 is fixed to the third base region 10c. In this example, a first support insulating portion 21i is provided between the third base region 10c and the first support portion 21. The first support portion 21 is fixed to the third base region 10c via the first support insulating portion 21i.

A first direction D1 from the third base region 10c to the first support portion 21 is defined as a Z-axis direction. One direction perpendicular to the Z-axis direction is defined as an X-axis direction. The direction perpendicular to the Z-axis direction and the X-axis direction is defined as a Y-axis direction.

The first movable portion 23 is supported by the first support portion 21. The first movable portion 23 includes a first movable region 23a and a second movable region 23b. A first gap G1 is provided between the first base region 10a and the first movable region 23a.

In this example, the sensor 110 further includes a first connecting portion 24. The first connecting portion 24 is supported by the first support portion 21. The first connecting portion 24 connects the first movable portion 23 to the first support portion 21.

For example, the first face 10f further includes a fourth base region 10d. A gap (for example, a third gap G3) is provided between the fourth base region 10d and the first connecting portion 24. The first connecting portion 24 is, for example, a spring portion.

The first insulating member 31 is fixed to the second base region 10b. In the first direction D1 from the third base region 10c to the first support portion 21, the first insulating member 31 is provided between the second base region 10b and the second movable region 23b. A second gap G2 is provided between the first insulating member 31 and the second movable region 23b.

A distance along the first direction D1 between the first base region 10a and the first movable region 23a is defined as a first distance d1. A distance along the first direction D1 between the first insulating member 31 and the second movable region 23b is defined as a second distance d2. The second distance d2 is shorter than the first distance d1.

The first insulating member 31 corresponds to a protrusion provided on a part of the first face 10f. A first movable portion 23 is provided apart from the first insulating member 31. The first insulating member 31 functions as a stopper for movement of the first movable portion 23. Excessive displacement of the first movable portion 23 is suppressed by providing the first insulating member 31. Excessive displacement includes a component in the first direction D1. For example, damage to the first movable portion 23 is suppressed. For example, sticking is suppressed. According to the embodiment, a sensor with stable characteristics can be provided.

As shown in FIG. 1, a distance along the first direction D1 between the fourth base region 10d and the first connecting portion 24 is defined as a third distance d3. The second distance d2 is shorter than the third distance d3.

In one example, the first distance d1 is not less than 0.5 μm and not more than 10 μm. The second distance d2 is not less than 0.1 μm and not more than 2 μm. The third distance d3 is not less than 0.5 μm and not more than 10 μm. The length (thickness h1) along the first direction of the first insulating member 31 is, for example, not less than 0.5 μm and not more than 9.9 μm.

In this example, the sensor 110 further includes a first fixed electrode 22. The first fixed electrode 22 is fixed to the first face 10f. In this example, a first fixed insulating portion 22i is provided between the first face 10f and the first fixed electrode 22. The first fixed electrode 22 is fixed to the first face 10f via the first fixed insulating portion 22i.

The first fixed electrode 22 faces the first movable portion 23. In this example, the first fixed electrode 22 faces the first movable portion 23 in the second direction D2 crossing the first direction D1. The second direction D2 is, for example, the X-axis direction.

As shown in FIG. 1, the first movable portion 23 includes a hole 23h being along the first direction D1. A part of the first fixed electrode 22 passes through the hole 23h.

As shown in FIG. 1, a controller 70 may be provided. The first movable portion 23 is electrically connected to the first support portion 21. The controller 70 is electrically connected to the first movable portion 23 via the first support portion 21. The controller 70 is electrically connected to the first fixed electrode 22. In this example, the controller 70 is electrically connected to the first support portion 21 via a first support electrode layer 21E provided at the first support portion 21. In this example, the controller 70 is electrically connected to the first fixed electrode 22 via the first fixed electrode layer 22E provided on the first fixed electrode 22.

The controller 70 is configured to supply an AC voltage between the first movable portion 23 and the first fixed electrode 22. As a result, the first movable portion 23 can vibrate. The vibration state changes depending on a force received from the outside. The received force can be detected by detecting the change in the vibration state.

As shown in FIG. 2, a plurality of first fixed electrodes 22 may be provided. A first support portion 21 is provided between one of the plurality of first fixed electrodes 22 and another one of the plurality of first fixed electrodes 22. A plurality of first insulating members 31 may be provided.

In one example, a distance between the first insulating member 31 and the first support portion 21 is longer than a distance between the first fixed electrode 22 and the first support portion 21. For example, the first insulating member 31 may be provided outside the first fixed electrode 22. In the case where the first movable portion 23 is displaced in a direction inclined with respect to the X-Y plane, excessive displacement can be more effectively suppressed.

As described above, in this example, the first fixed insulating portion 22i is provided. The first fixed insulating portion 22i is provided between the base body 10s and the first fixed electrode 22. The first insulating member 31 may include a material included in the first fixed insulating portion 22i. For example, the first insulating member 31 may be formed of an insulating film serving as the first fixed insulating portion 22i. The first insulating member 31 is obtained by a highly efficient and simple process.

For example, a thickness h1 of the first insulating member 31 along the first direction D1 may be substantially the same as a thickness of the first fixed insulating portion 22i along the first direction D1. For example, the thickness h1 is not less than 0.8 times and not more than 1.2 times the thickness along the first direction D1 of the first fixed insulating portion 22i.

As described above, in this example, the first support insulating portion 21i is provided. The first support insulating portion 21i is provided between the third base region 10c and the first support portion 21. The first insulating member 31 may include a material included in the first support insulating portion 21i. For example, the first insulating member 31 may be formed of an insulating film serving as the first support insulating portion 21i. The first insulating member 31 is obtained by a highly efficient and simple process. The material of the first support insulating portion 21i may be the same as the material of the first fixed insulating portion 22i.

For example, the thickness h1 of the first insulating member 31 along the first direction D1 may be substantially the same as the thickness of the first support insulating portion 21i along the first direction D1. For example, the thickness h1 is not less than 0.8 times and not more than 1.2 times of the thickness along the first direction D1 of the first support insulating portion 21i.

For example, the first insulating member 31 includes silicon oxide. The first movable portion 23 includes silicon. In one example, the base body 10s may include silicon. In the embodiments, the base body 10s may include, for example, a metal and at least one selected from the group consisting of oxygen, nitrogen, and carbon. The base body 10s may include, for example, at least one selected from the group consisting of a metal oxide, a metal nitride and a metal carbide. The base body 10s is, for example, insulative. The base body 10s may be processed by, for example, a semiconductor process.

Figure 3:
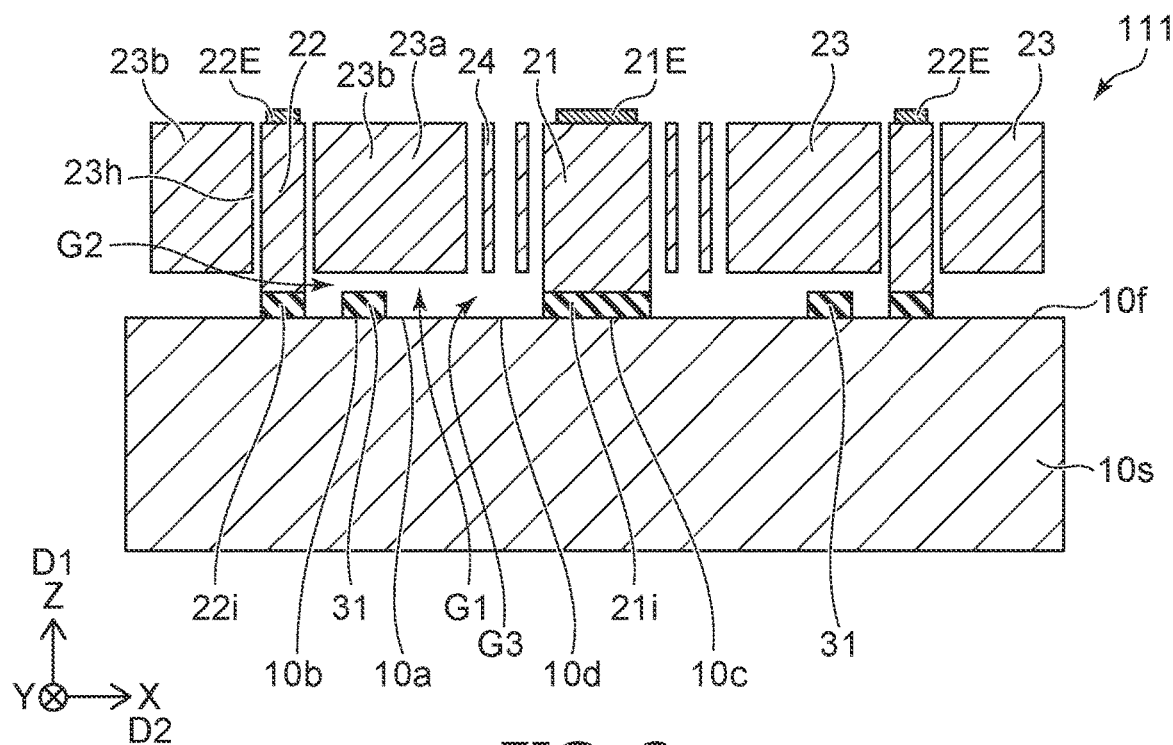
FIG. 3 is a schematic cross-sectional view illustrating a sensor according to the first embodiment.

FIG. 3 is a schematic cross-sectional view illustrating a sensor according to the first embodiment.

As shown in FIG. 3, in a sensor 111 according to the embodiment, the distance between the first insulating member 31 and the first support portion 21 is shorter than the distance between the first fixed electrode 22 and the first support portion 21. The configuration of the sensor 111 excluding this may be the same as the configuration of the sensor 110. Excessive displacement can be more effectively suppressed in the sensor 111 as well.

The first insulating member 31 illustrated in FIG. 1 and the first insulating member 31 illustrated in FIG. 3 may be provided in one sensor.

Figure 4:
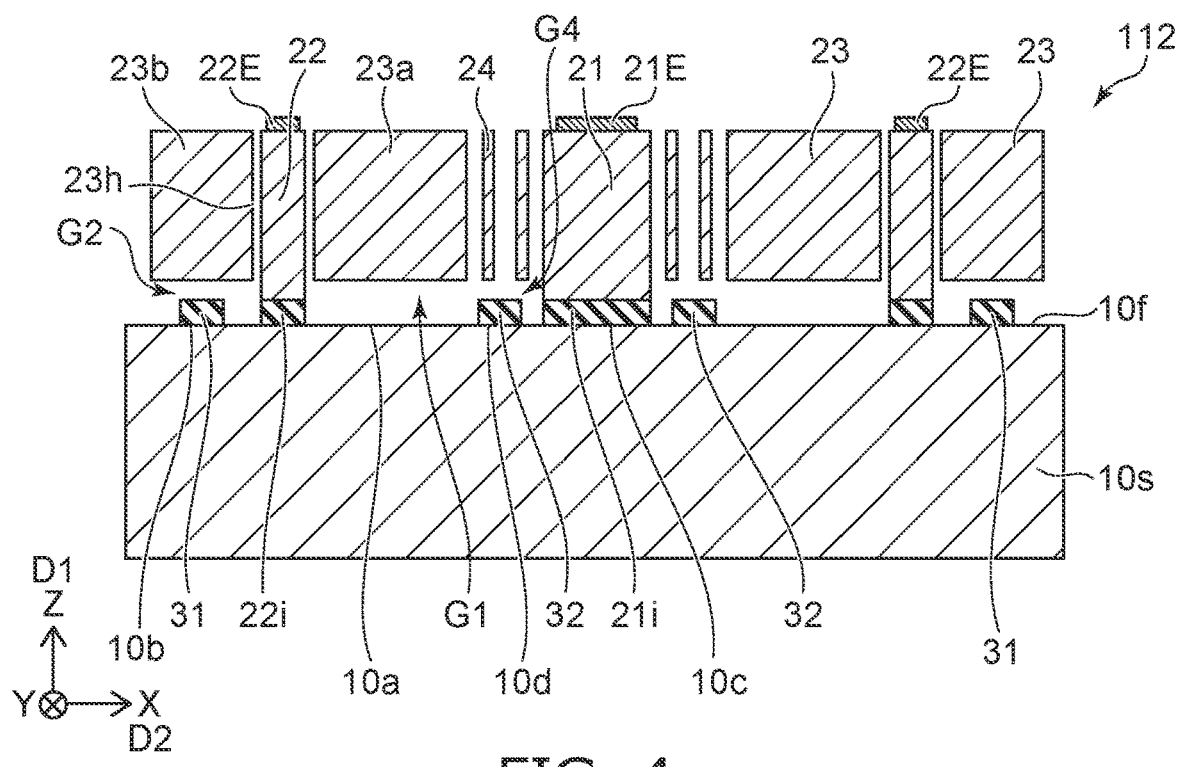
FIG. 4 is a schematic cross-sectional view illustrating a sensor according to the first embodiment.

FIG. 4 is a schematic cross-sectional view illustrating a sensor according to the first embodiment.

As shown in FIG. 4, in a sensor 112 according to the embodiment, a second insulating member 32 is further provided. Except for this, the configuration of the sensor 112 may be the same as the configuration of the sensor 110 or the configuration of the sensor 111.

The first face 10f includes a fourth base region 10d. The second insulating member 32 is fixed to the fourth base region 10d. A fourth gap G4 is provided between the second insulating member 32 and the first connecting portion 24. Excessive displacement of the first connecting portion 24 can be suppressed by providing the second insulating member 32.

Figure 5:
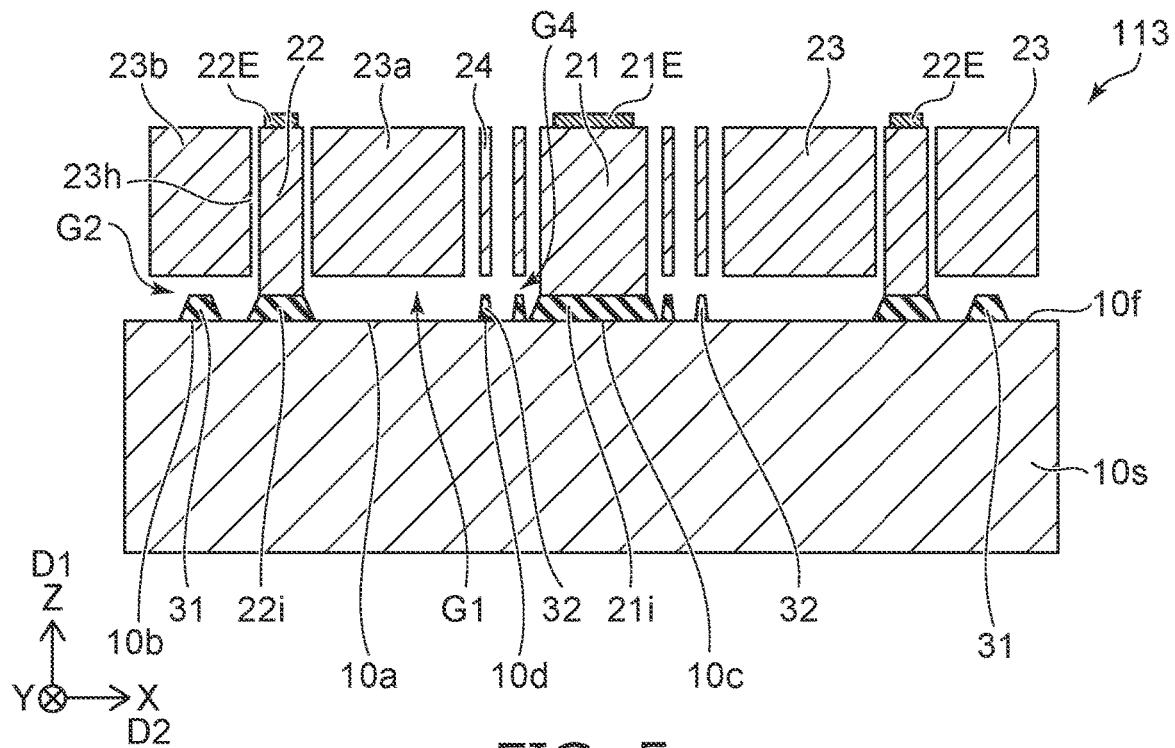
FIG. 5 is a schematic cross-sectional view illustrating the sensor according to the first embodiment.

FIG. 5 is a schematic cross-sectional view illustrating the sensor according to the first embodiment.

As shown in FIG. 5, in a sensor 113 according to the embodiment, the side face of the first insulating member 31 is inclined with respect to the first direction D1. The side face of the second insulating member 32 is inclined with respect to the first direction D1. Except for this, the configuration of the sensor 113 may be the same as the configuration of the sensors 110 to 112.

A position of at least a part of the second insulating member 32 in the X-Y plane may be different from a position of at least a part of the first connecting portion 24 in the X-Y plane.

Figure 6:
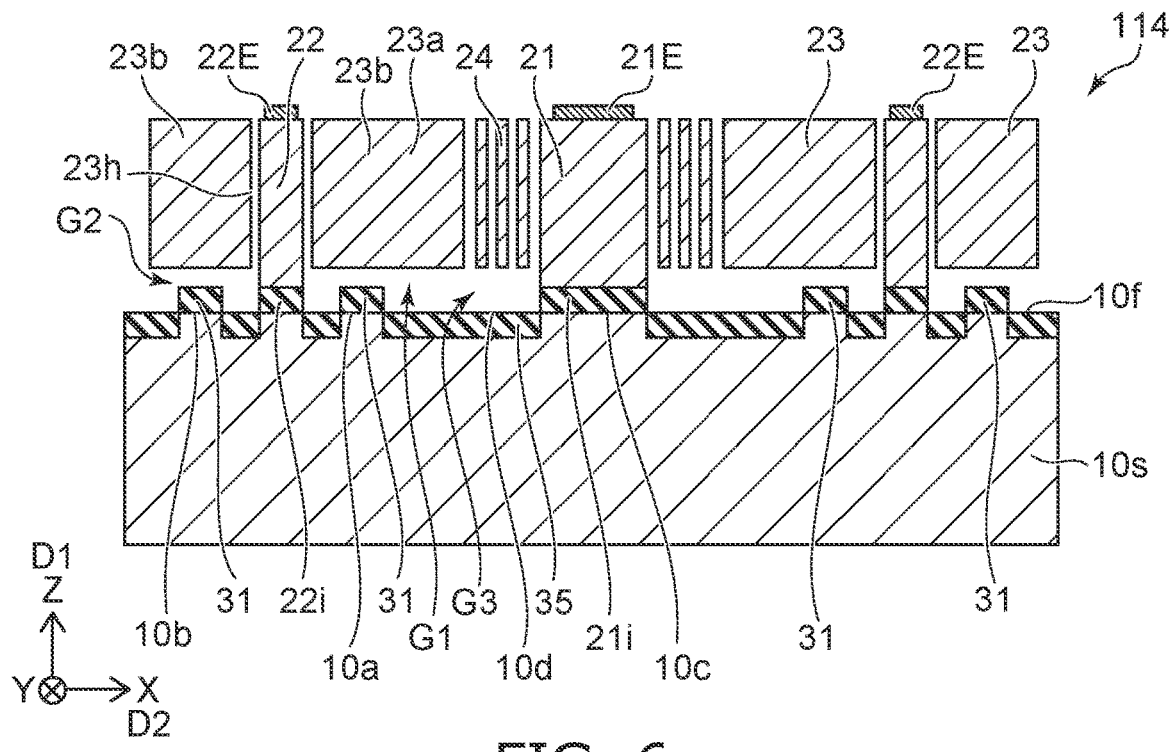
FIG. 6 is a schematic cross-sectional view illustrating a sensor according to the first embodiment.

FIG. 6 is a schematic cross-sectional view illustrating a sensor according to the first embodiment.

As shown in FIG. 6, in a sensor 114 according to the embodiment, an insulating film 35 may be provided on the first face 10f of the base body 10s. Except for this, the configuration of the sensor 114 may be the same as the configuration of the sensors 110 to 113.

For example, the insulating film 35 is formed by oxidizing the base body 10s. For example, the surface of the base body 10s is covered with the insulating film 35 and the first insulating member 31. For example, damage to the base body 10s is suppressed. For example, in the process for forming the first movable portion 23, it is possible to suppress unintentional removal of a part of the member serving as the base body 10s.

Figure 7:
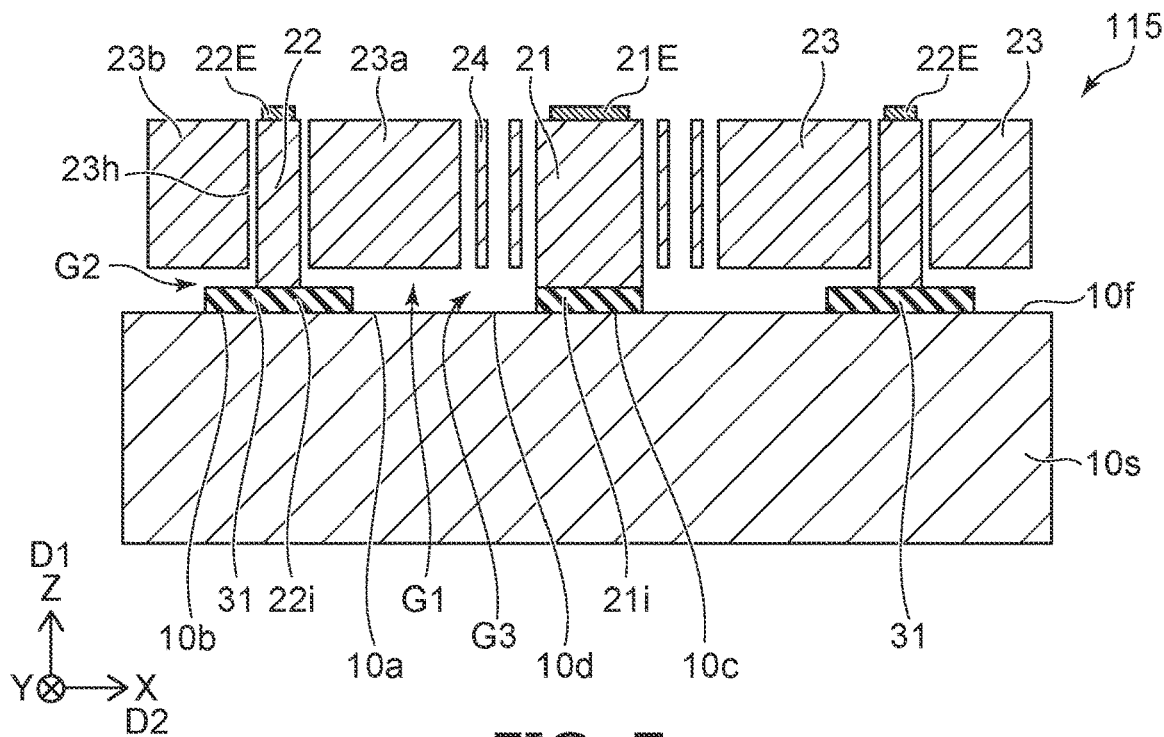
FIG. 7 is a schematic cross-sectional view illustrating a sensor according to the first embodiment.

FIG. 7 is a schematic cross-sectional view illustrating a sensor according to the first embodiment.

As shown in FIG. 7, in a sensor 115 according to the embodiment, the first insulating member 31 is continuous with the first fixed insulating portion 22i. Except for this, the configuration of the sensor 115 may be the same as the configuration of the sensors 110 to 114.

Figure 8:
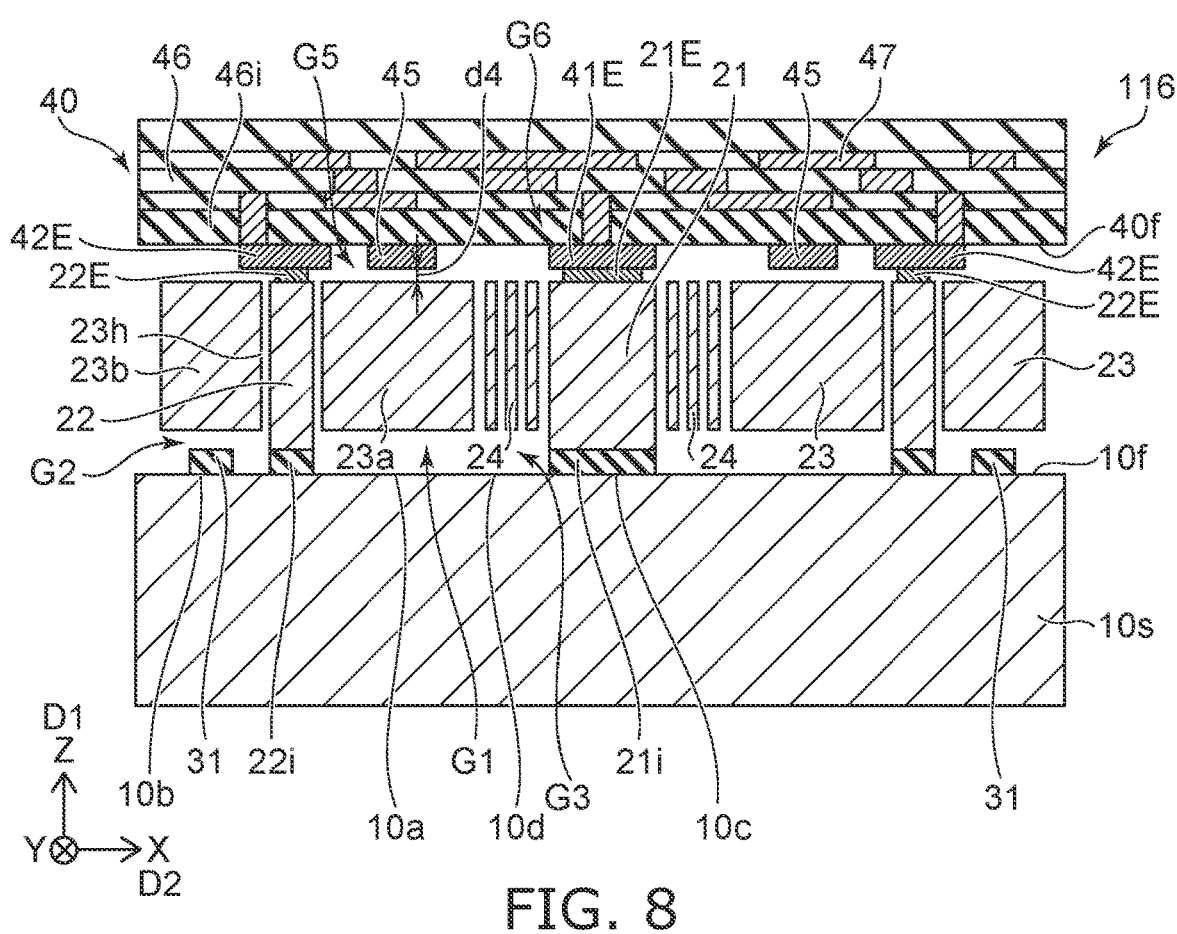
FIG. 8 is a schematic cross-sectional view illustrating a sensor according to the first embodiment.

FIG. 8 is a schematic cross-sectional view illustrating a sensor according to the first embodiment.

As shown in FIG. 8, a sensor 116 according to the embodiment includes an opposing substrate 40, a first opposing electrode layer 41E, and a first support electrode layer 21E. Except for this, the configuration of the sensor 116 may be the same as the configuration of the sensors 110 to 115.

The opposing substrate 40 includes a second face 40f. The first opposing electrode layer 41E is fixed to the second face 40f. An opposing substrate member 45 is fixed to the second face 40f. The first support electrode layer 21E is fixed to the first support portion 21.

The first support portion 21 and the first movable portion 23 are provided between the first face 10f and the second face 40f. The first support electrode layer 21E faces the first opposing electrode layer 41E. The first support electrode layer 21E is electrically connected to the first opposing electrode layer 41E. For example, the first support electrode layer 21E is bonded to the first opposing electrode layer 41E. A fifth gap G5 is provided between the first movable portion 23 and the second face 40f.

The opposing substrate 40 may include, for example, electrical circuit. The electrical circuit may include, for example, CMOS (Complementary Metal Oxide Semiconductor). At least a part of the controller 70 may be provided in the opposing substrate 40. For example, a small sensor can be obtained. The opposing substrate 40 may include, for example, an insulating layer 46i and a conductive layer 47 (e.g., wiring layer). The insulating layer 46i may be provided on the side of the second face 40f of the opposing substrate 40. For example, the insulating layer 46i may be provided between at least a part of the first opposing electrode layer 41E and the opposing substrate 40.

As shown in FIG. 8, the sensor 116 may include the opposing substrate member 45. The opposing substrate member 45 is fixed to the second face 40f. A sixth gap G6 is provided between the first movable portion 23 and the opposing substrate member 45. The opposing substrate member 45 functions, for example, as a stopper. By providing the opposing substrate member 45, excessive displacement of the first movable portion 23 along the first direction D1 can be suppressed.

For example, the opposing substrate member 45 may include the material included in the first opposing electrode layer 41E. For example, the opposing substrate member 45 may be formed from a conductive layer serving as the first opposing electrode layer 41E. The opposing substrate member 45 and the first opposing electrode layer 41E may include a metal such as gold.

As shown in FIG. 8, a second opposing electrode layer 42E may be provided at the second face 40f. The second opposing electrode layer 42E faces the first fixed electrode layer 22E. The second opposing electrode layer 42E is electrically connected to the first fixed electrode layer 22E.

An example of a method of manufacturing the sensor according to the embodiment will be described below.

FIGS. 9A, 9B, 10A, and 10B are schematic cross-sectional views illustrating a method of manufacturing the sensor according to the first embodiment.

Figure 9A:
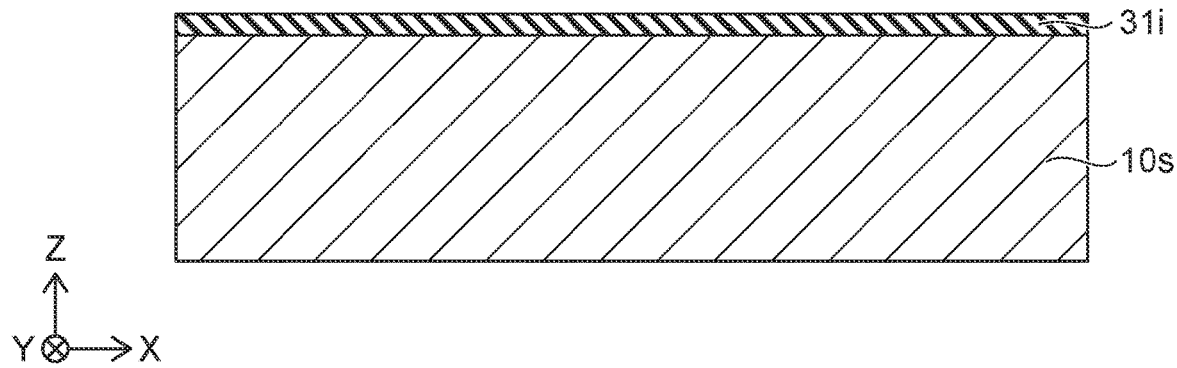
FIGS. 9A and 9B are schematic cross-sectional views illustrating a method of manufacturing the sensor according to the first embodiment.

As shown in FIG. 9A, an insulating film 31i is provided on the base body 10s. As described later, at least a part of the insulating film 31i becomes the first insulating member 31. The base body 10s includes, for example, silicon. The insulating film 31i includes, for example, silicon oxide.

Figure 9B:
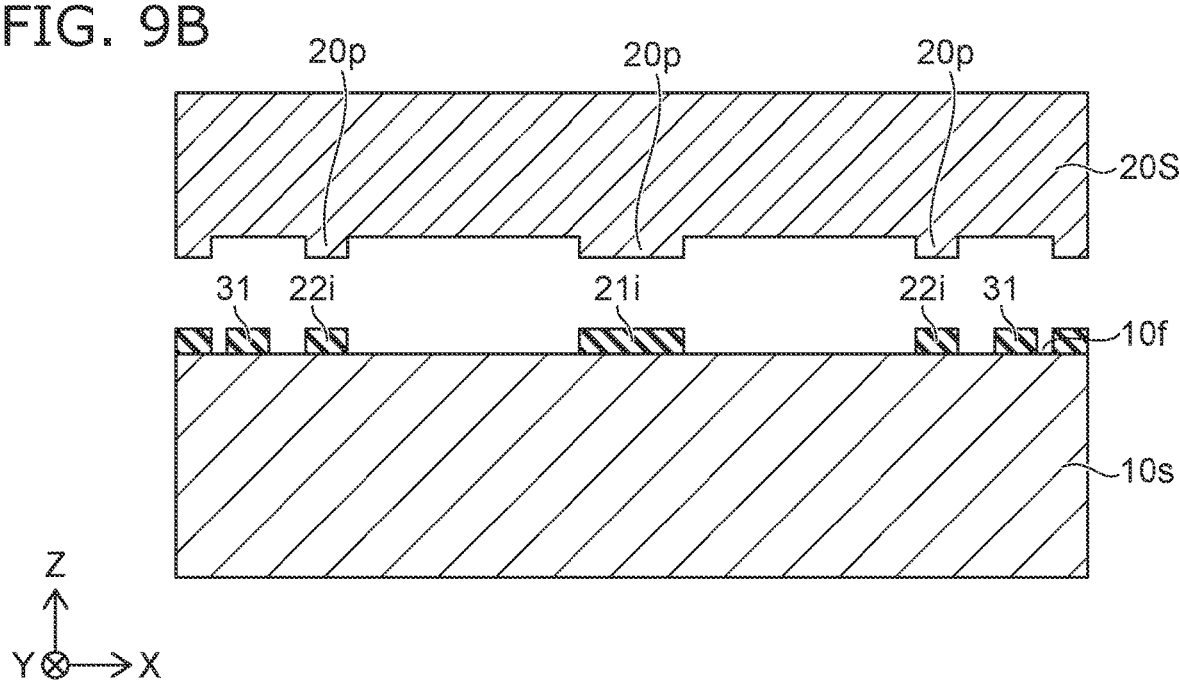

As shown in FIG. 9B, a part of the insulating film 31i is removed. As a result, the first insulating member 31 is obtained. At this time, the first support insulating portion 21i and the first fixed insulating portion 22i may be obtained from the insulating film 31i.

As shown in FIG. 9B, a workpiece 20S is prepared. A protruding portion 20p is provided on the surface of the workpiece 20S. The workpiece 20S is placed so that the protruding portion 20p faces the base body 10s. The workpiece 20S includes silicon, for example.

Figure 10A:
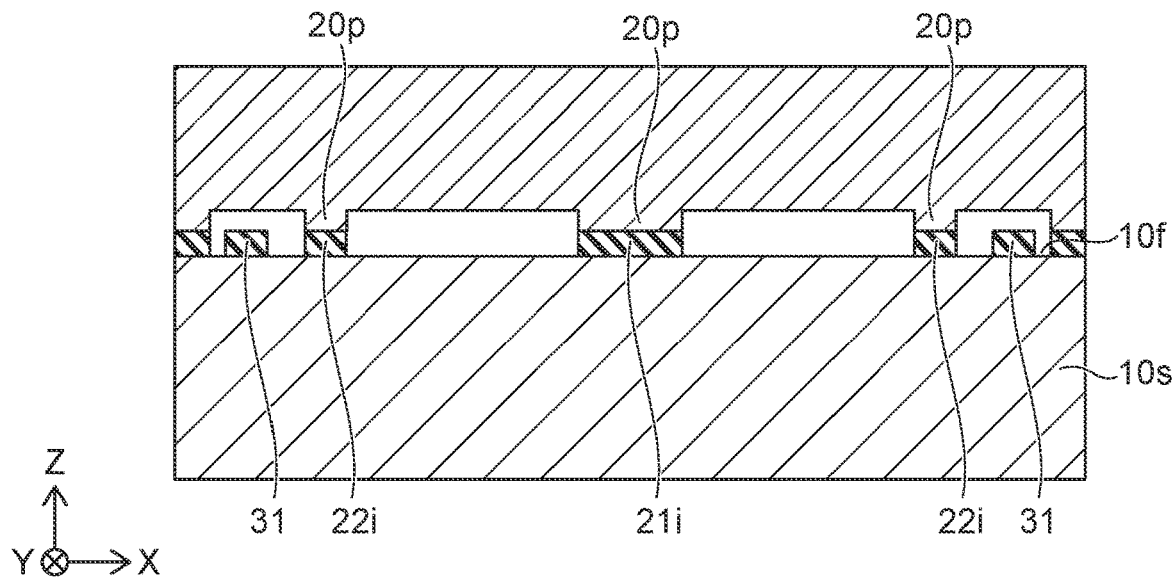
FIGS. 10A and 10B are schematic cross-sectional views illustrating a method of manufacturing the sensor according to the first embodiment.

As shown in FIG. 10A, a part of the protruding portion 20p is bonded with the first support insulating portion 21i. Another part of the protruding portion 20p is connected to the first fixed insulating portion 22i. At this time, the first insulating member 31 is separated from the workpiece 20S.

Figure 10B:
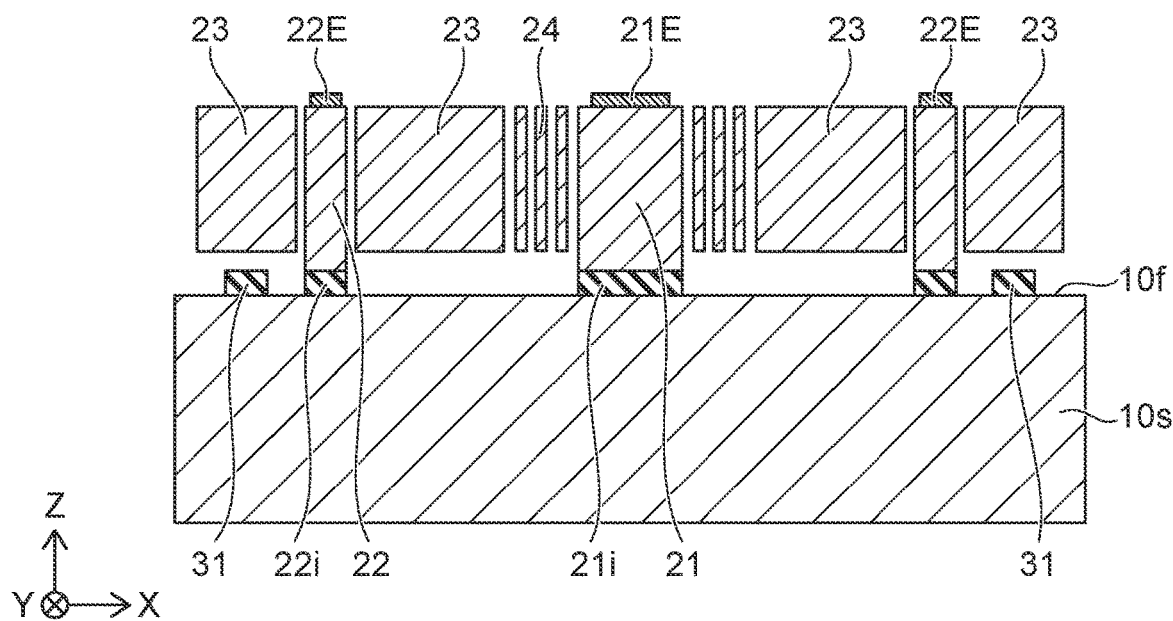

As shown in FIG. 10B, the first support portion 21, the first fixed electrode 22, the first movable portion 23 and the first connecting portion 24 are obtained by removing a part of the workpiece 20S. After that, the first support electrode layer 21E and the first fixed electrode layer 22E are formed. As a result, for example, the sensor 110 is obtained.

In the embodiments, a stopper (such as the first insulating member 31) can be provided at any position. Excessive displacement of the first movable portion 23 can be suppressed. In the embodiment, the area of the first insulating member 31 may be small. For example, electrostatic attraction can be reduced. Sticking can be suppressed. The stopper (first insulating member 31, etc.) is insulative. Electrical short is suppressed. For example, high reliability can be obtained.

Second Embodiment

A second embodiment relates to an electronic device.

Figure 11:
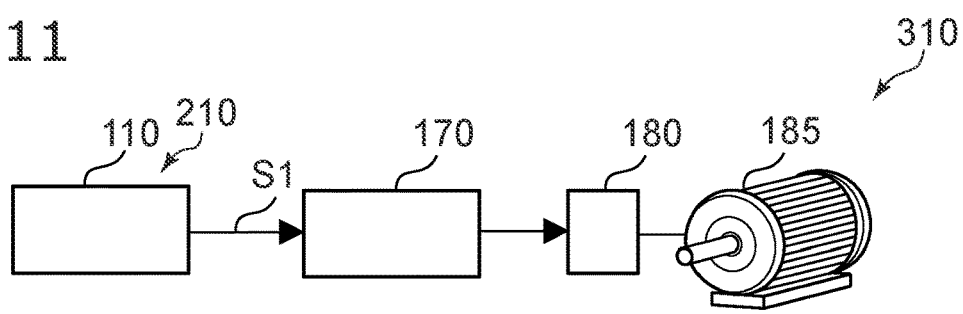
FIG. 11 is a schematic view illustrating an electronic device according to a second embodiment.

FIG. 11 is a schematic view illustrating an electronic device according to the second embodiment.

As shown in FIG. 11, an electronic device 310 according to the embodiment includes a circuit controller 170 and the sensor according to the embodiment. The sensor 110 (or sensor device 210) is illustrated as the sensor in the example of FIG. 11. The circuit controller 170 is configured to control a circuit 180 based on a signal S1 obtained from the sensor. The circuit 180 is, for example, a control circuit of a drive device 185, etc. According to the embodiment, the circuit 180 for controlling the drive device 185 and the like can be controlled with high accuracy based on the highly-accurate detection result.

FIGS. 12A to 12H are schematic views illustrating applications of the electronic device.

Figure 12A:
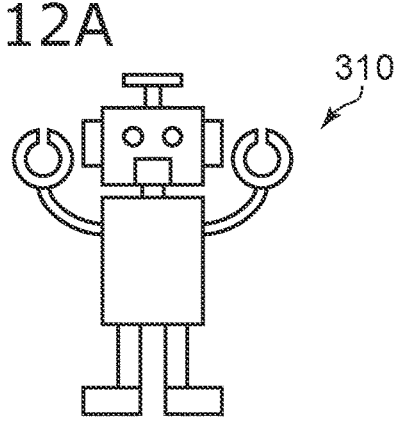
FIGS. 12A to 12H are schematic views illustrating applications of the electronic device.
Figure 12B:
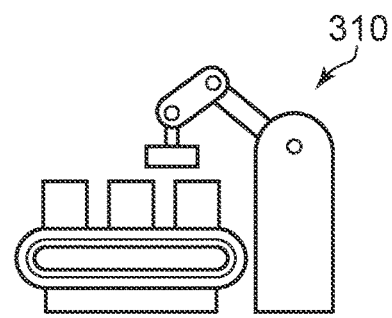
Figure 12C:
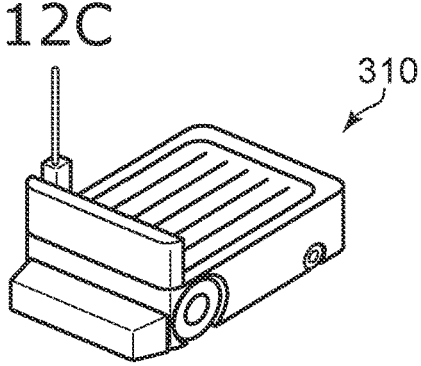
Figure 12D:
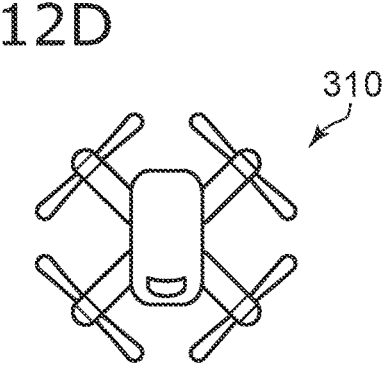
Figure 12E:
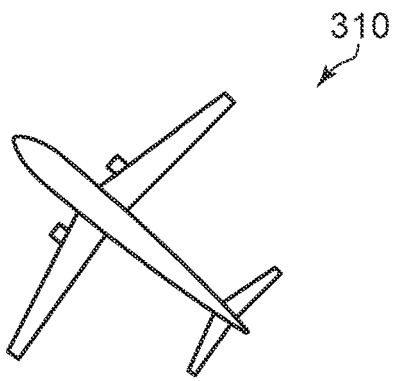
Figure 12F:
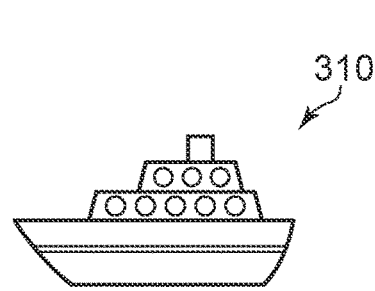
Figure 12G:
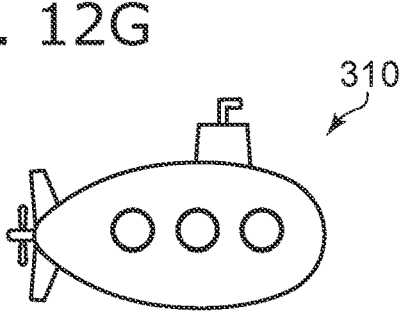
Figure 12H:
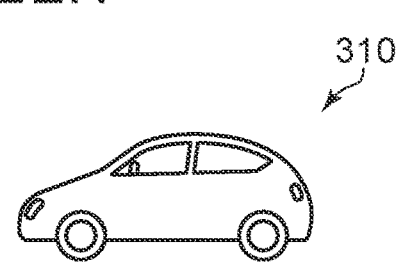

As shown in FIG. 12A, the electronic device 310 may be at least a part of a robot. As shown in FIG. 12B, the electronic device 310 may be at least a part of a machining robot provided in a manufacturing plant, etc. As shown in FIG. 12C, the electronic device 310 may be at least a part of an automatic guided vehicle inside a plant, etc. As shown in FIG. 12D, the electronic device 310 may be at least a part of a drone (an unmanned aircraft). As shown in FIG. 12E, the electronic device 310 may be at least a part of an airplane. As shown in FIG. 12F, the electronic device 310 may be at least a part of a ship. As shown in FIG. 12G, the electronic device 310 may be at least a part of a submarine. As shown in FIG. 12H, the electronic device 310 may be at least a part of an automobile. The electronic device 310 may include, for example, at least one of a robot or a mobile body.

Embodiments may include the following configurations (e.g., technological proposals).

Configuration 1

A sensor, comprising:
a base body including a first face, the first face including a first base region, a second base region, and a third base region;
a first support portion fixed to the third base region;
a first movable portion supported by the first support portion, the first movable portion including a first movable region and a second movable region, a first gap being provided between the first base region and the first movable region; and
a first insulating member fixed to the second base region, the first insulating member being located between the second base region and the second movable region in a first direction from the third base region to the first support portion, a second gap being provided between the first insulating member and the second movable region, a second distance between the first insulating member and the second movable region along the first direction being shorter than a first distance between the first base region and the first movable region along the first direction.

Configuration 2

The sensor according to Configuration 1, further comprising
a first connecting portion supported by the first support portion, and
the first connecting portion connecting the first movable portion to the first support portion.

Configuration 3

The sensor according to Configuration 2, wherein
the first face further includes a fourth base region, and
a third gap is provided between the fourth base region and the first connecting portion.

Configuration 4

The sensor according to Configuration 3, wherein the second distance is shorter than a third distance along the first direction between the fourth base region and the first connecting portion.

Configuration 5

The sensor according to Configuration 2, further comprising
a second insulating member,
the first face further including a fourth base region;
the second insulating member being fixed to the fourth base region, and
a fourth gap being provided between the second insulating member and the first connecting portion.

Configuration 6

The sensor according to any one of Configurations 1 to 5, further comprising
a first fixed electrode fixed to the first face,
the first fixed electrode facing the first movable portion.

Configuration 7

The sensor according to Configuration 6, wherein the first fixed electrode faces the first movable portion in a second direction crossing the first direction.

Configuration 8

The sensor according to Configuration 7, wherein
the first movable portion includes a hole being along the first direction, and
a part of the first fixed electrode passes through the hole.

Configuration 9

The sensor according to any one of Configurations 6 to 8 wherein a distance between the first insulating member and the first support portion is longer than a distance between the first fixed electrode and the first support portion.

Configuration 10

The sensor according to any one of Configurations 6 to 9, further comprising
a controller,
the first movable portion being electrically connected to the first support portion, and
the controller being configured to supply an AC voltage between the first movable portion and the first fixed electrode.

Configuration 11

The sensor according to any one of Configurations 6 to 10, further comprising
a first fixed insulating portion provided between the base body and the first fixed electrode,
the first insulating member including a material included in the first fixed insulating portion.

Configuration 12

The sensor according to Configuration 11, wherein a thickness of the first insulating member along the first direction is not less than 0.8 times and not more than 1.2 times a thickness of the first fixed insulating portion along the first direction.

Configuration 13

The sensor according to any one of Configurations 1 to 12, further comprising
 a first support insulating portion provided between the third base region and the first support portion,
 the first insulating member including a material included in the first support insulating portion.

Configuration 14

The sensor according to Configuration 13, wherein a thickness of the first insulating member along the first direction is not less than 0.8 times and not more than to 1.2 times a thickness of the first support insulating portion along the first direction.

Configuration 15

The sensor according to any one of Configurations 1 to 14, wherein
 the first insulating member includes silicon oxide, and
 the first movable portion includes silicon.

Configuration 16

The sensor according to any one of Configurations 1 to 15, further comprising:
 an opposing substrate including a second face;
 a first opposing electrode layer fixed to the second face; and
 a first support electrode layer fixed to the first support portion,
 the first support portion and the first movable portion being provided between the first face and the second face,
 the first support electrode layer facing the first opposing electrode layer,
 the first support electrode layer being electrically connected to the first opposing electrode layer, and
 a fifth gap being provided between the first movable portion and the second face.

Configuration 17

The sensor according to Configuration 16, further comprising
 an opposing substrate member fixed to the second face,
 a sixth gap being provided between the first movable portion and the opposing substrate member.

Configuration 18

The sensor according to Configuration 17, wherein the opposing substrate member includes a material included in the first opposing electrode layer.

Configuration 19

An electronic device, comprising:
 the sensor according to any one of Configurations 1 to 18; and
 a circuit controller configured to control a circuit based on a signal obtained from the sensor.

Configuration 20

The electronic device according to Configuration 19, wherein the electronic device includes at least one of a robot or a mobile body.

According to the embodiments, it is possible to provide a sensor and an electronic device with stable characteristics.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as base body, support portion, movable portion, electrode, insulating member, circuit portion, controller, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and electronic devices practicable by an appropriate design modification by one skilled in the art based on the sensors, and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
 a base body including a first face, the first face including a first base region, a second base region, and a third base region;
 a first support portion fixed to the third base region;
 a first movable portion supported by the first support portion, the first movable portion including a first movable region and a second movable region, a first gap being provided between the first base region and the first movable region;
 a first insulating member fixed to the second base region, the first insulating member being located between the second base region and the second movable region in a first direction from the third base region to the first support portion, a second gap being provided between the first insulating member and the second movable region, a second distance between the first insulating member and the second movable region along the first direction being shorter than a first distance between the first base region and the first movable region along the first direction; and
 a first fixed electrode fixed to the first face,
 the first fixed electrode facing the first movable portion in a second direction crossing the first direction, and
 a position of any portion of the first insulating member in a plane crossing the first direction being different from a position of the first fixed electrode in the plane.

2. The sensor according to claim 1, further comprising
 a first connecting portion supported by the first support portion, and
 the first connecting portion connecting the first movable portion to the first support portion.

3. The sensor according to claim 2, wherein
 the first face further includes a fourth base region, and
 a third gap is provided between the fourth base region and the first connecting portion.

4. The sensor according to claim 3, wherein the second distance is shorter than a third distance along the first direction between the fourth base region and the first connecting portion.

5. The sensor according to claim 2, further comprising a second insulating member,
the first face further including a fourth base region;
the second insulating member being fixed to the fourth base region, and
a fourth gap being provided between the second insulating member and the first connecting portion.

6. The sensor according to claim 1, wherein
the first movable portion includes a hole being along the first direction, and
a part of the first fixed electrode passes through the hole.

7. The sensor according to claim 1, wherein a distance between the first insulating member and the first support portion is longer than a distance between the first fixed electrode and the first support portion.

8. The sensor according to claim 1, further comprising a controller,
the first movable portion being electrically connected to the first support portion, and
the controller being configured to supply an AC voltage between the first movable portion and the first fixed electrode.

9. The sensor according to claim 1, further comprising a first fixed insulating portion provided between the base body and the first fixed electrode,
the first insulating member including a material included in the first fixed insulating portion.

10. The sensor according to claim 9, wherein a thickness of the first insulating member along the first direction is not less than 0.8 times and not more than 1.2 times a thickness of the first fixed insulating portion along the first direction.

11. The sensor according to claim 1, further comprising a first support insulating portion provided between the third base region and the first support portion,
the first insulating member including a material included in the first support insulating portion.

12. The sensor according to claim 11, wherein a thickness of the first insulating member along the first direction is not less than 0.8 times and not more than to 1.2 times a thickness of the first support insulating portion along the first direction.

13. The sensor according to claim 1, wherein
the first insulating member includes silicon oxide, and
the first movable portion includes silicon.

14. The sensor according to claim 1, further comprising:
an opposing substrate including a second face;
a first opposing electrode layer fixed to the second face; and
a first support electrode layer fixed to the first support portion,
the first support portion and the first movable portion being provided between the first face and the second face,
the first support electrode layer facing the first opposing electrode layer,
the first support electrode layer being electrically connected to the first opposing electrode layer, and
a fifth gap being provided between the first movable portion and the second face.

15. The sensor according to claim 14, further comprising an opposing substrate member fixed to the second face,
a sixth gap being provided between the first movable portion and the opposing substrate member.

16. The sensor according to claim 15, wherein the opposing substrate member includes a material included in the first opposing electrode layer.

17. An electronic device, comprising:
the sensor according to claim 1; and
a circuit controller configured to control a circuit based on a signal obtained from the sensor.

18. The electronic device according to claim 17, wherein the electronic device includes at least one of a robot or a mobile body.

* * * * *